INVENTOR
GUENTER SPOHR
BY Toulmin & Toulmin
ATTORNEYS

Jan. 19, 1965　　　　　G. SPOHR　　　　　3,166,501
PLANT FOR SEWAGE TREATMENT
Filed May 17, 1963　　　　　　　　　　　　　4 Sheets-Sheet 4
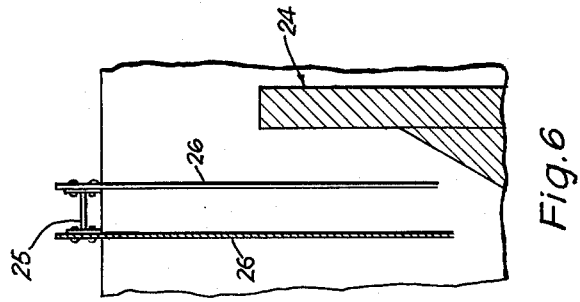
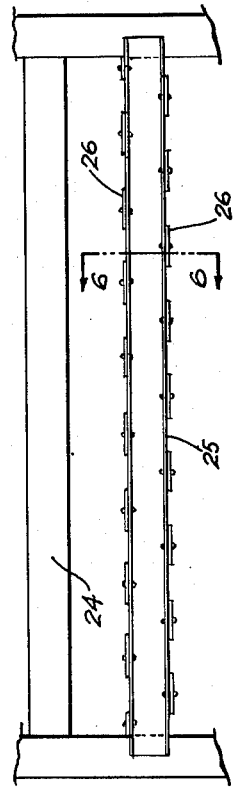
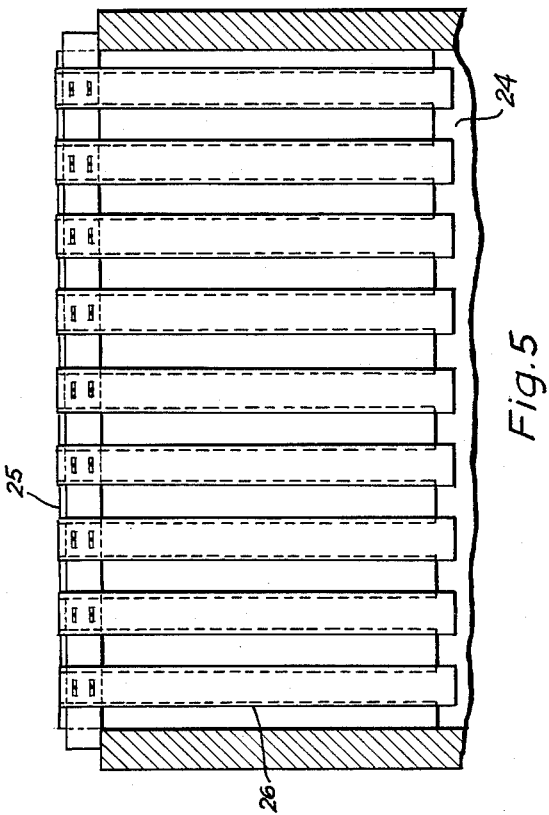
INVENTOR
GUENTER SPOHR
BY Toulmin & Toulmin
ATTORNEYS United States Patent Office 3,166,501
Patented Jan. 19, 1965

3,166,501
PLANT FOR SEWAGE TREATMENT
Guenter Spohr, 2243 Carlisle Road, York, Pa.
Filed May 17, 1963, Ser. No. 281,275
3 Claims. (Cl. 210—195)

The present invention relates to the treatment of sewage and more particularly to a compact and centralized sewage treatment plant for combined anaerobic and aerobic treatment.

Biological treatment plants for small amounts of sewage varying in characteristics and quantity are usually limited by high costs of construction. Therefore such plants employ either plain aeration or trickling filter principles in the operation thereof. Both of these principles utilize the aerobic treatment of sewage. In view of the high cost of construction for such plants, it is extremely desirable that the operating efficiency of such treatment plants be as high as possible.

It is, therefore, the principal object of the present invention to provide a novel and improved plant for the biological treatment of sewage.

It is a further object of the present invention to provide a highly efficient biological treatment plant for small and variable quantities of both domestic and industrial sewage, but which plant can be constructed at a relatively low cost.

It has been discovered that by mixing anaerobic sludge flocs together with incoming raw sewage and then subjecting this mixed sewage to anaerobic digestion followed by sedimentation, aeration and a final sedimentation, the efficiency of this biological treatment will be considerably increased.

In the process disclosed herein anaerobic sludge has the same activity as aerobic sludge providing there is no interference with the formation of the anaerobic sludge flocs. A complete mixing of the substrate and bacteriological matter is achieved in the anaerobic digestion phase. After colloids have been absorbed in the anaerobic sludge flocs, the organic substrate in the sewage is converted directly into sludge methane and $CO_2$. As a result, the sensitivity against shock loads of industrial waste when compared to the sensitivity of purely biological aerobic systems is considerably reduced.

After mixing of anaerobic sludge flocs with the raw sewage in a mixing tank, the present process also provides for substantially decreasing the digestion time of the settled sewage sludge in the anaerobic digestion tank by utilizing heat transfer principles. This decrease is accomplished by an auxiliary air supply line submerged within the anaerobic digestion tank whereby heating of the sewage sludge therein accelerates the anaerobic digestion. Recirculation devices are provided between the settling tanks and the anaerobic digestion tank in order to further improve the quality of the digested sludge. Sludge may also be drawn off from the settling tanks.

After the sewage is treated in the anaerobic digestion tank, it is flowed to an anaerobic settling tank. Settled sludge is then recirculated from this anaerobic settling tank to the mixing tank located in the anaerobic digestion tank so that the sludge may be mixed with the incoming raw sewage. The liquid effluent from the anaerobic settling tank is then flowed to an aerobic digestion tank wherein the sewage is subjected to aeration and the resulting oxidation of the sulfides.

After this aeration, the sewage is flowed to a final settling tank through an improved baffle structure for further treatment. The effluent remaining after sedimentation is then subjected to chlorination and is discharged from the plant. The discharged effluent has been found to be of a considerably superior quality.

Other objects and advantages of the present invention will be apparent upon reference to the accompanying description when taken in conjunction with the following drawings wherein—

FIGURE 4 is a top plan view of the baffle structure between the aerobic settling tank and the aerobic aeration tank;

FIGURE 5 is an elevational view of the baffle structure illustrated in FIGURE 4; and FIGURE 6 is a sectional view taken along the line 4—4 of FIGURE 4, and illustrating the relationship of the baffle structure to the wall separating the aerobic settling tank and the aerobic aeration tank.

A specific embodiment of the present invention will next be described in detail with reference to the drawings wherein like reference symbols indicate the same parts throughout the various views.

Figure 1:
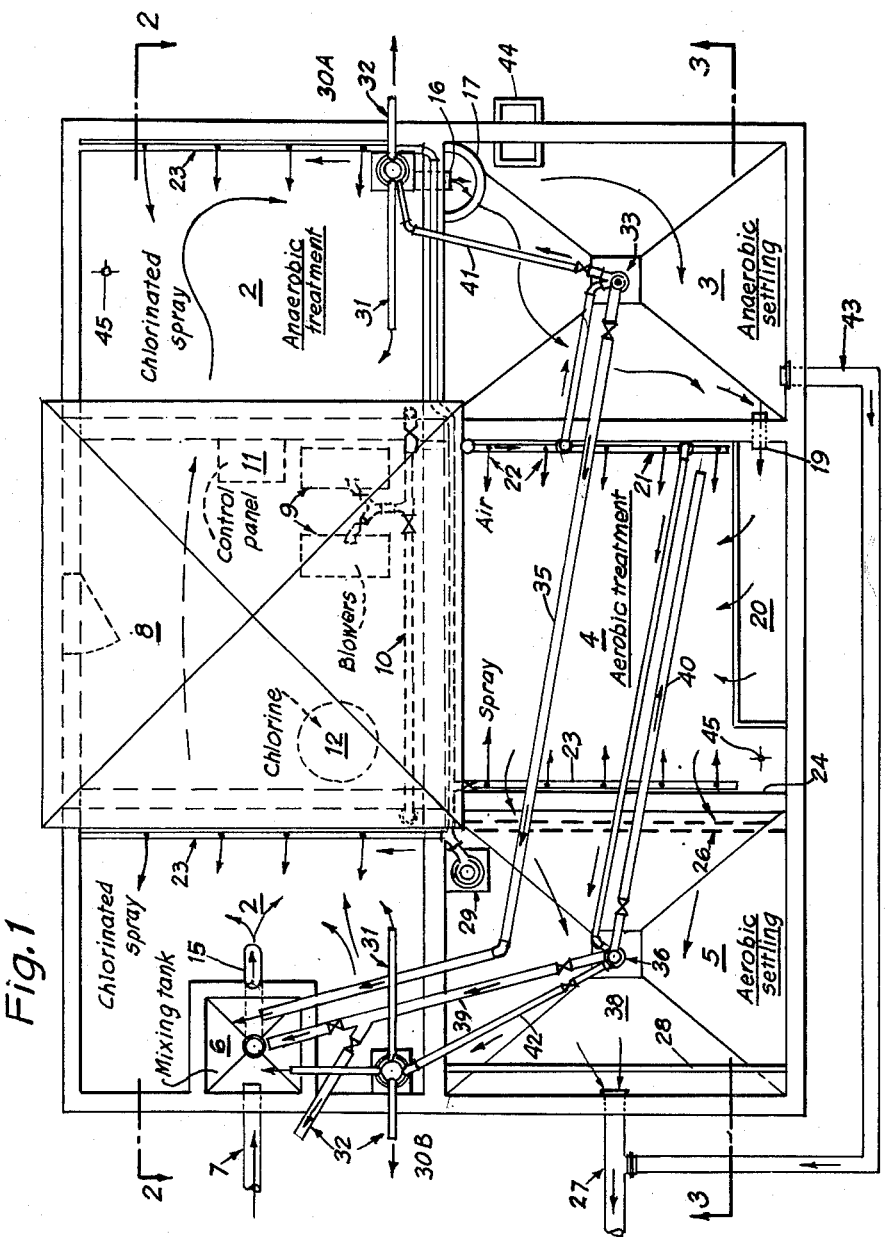
FIGURE 1 is a top plan view of the sewage treatment plant of the present invention.

As can be seen in FIGURE 1, the treatment plant comprises a rectangular enclosure 1 fabricated from prestressed or reinforced concrete, concrete blocks, or metal. The enclosure is divided by walls into an anaerobic digesting tank 2, which extends along one edge of the enclosure 1, and an anaerobic settling tank 3, an aerobic aeration tank 4, and an aerobic settling tank 5, which latter three tanks are positioned alongside the anaerobic digestion tank 2. At one end of the anaerobic digestion tank 2 there is provided a mixing tank 6 into which is introduced raw sewage through a sewage supply conduit 7.

Figure 2:
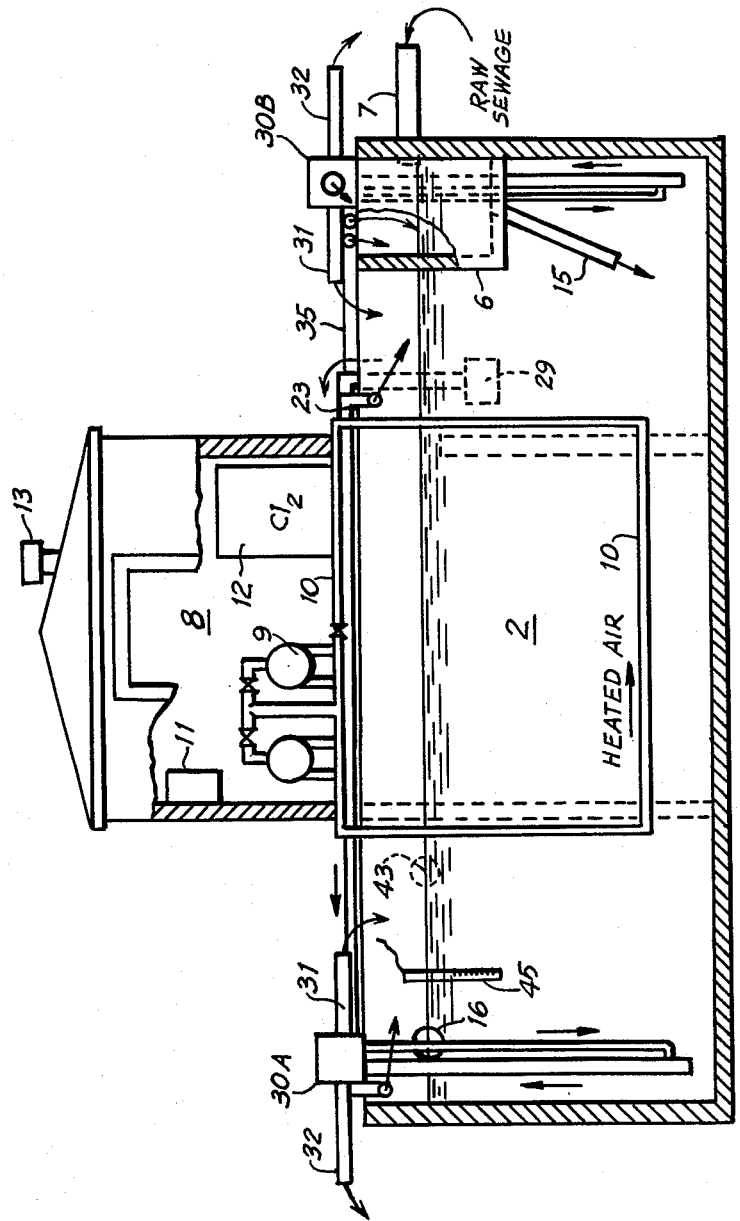
FIGURE 2 is a vertical sectional view taken along the line 2—2 of FIGURE 1, and showing the anaerobic digestion tank and the control house.
Figure 3:
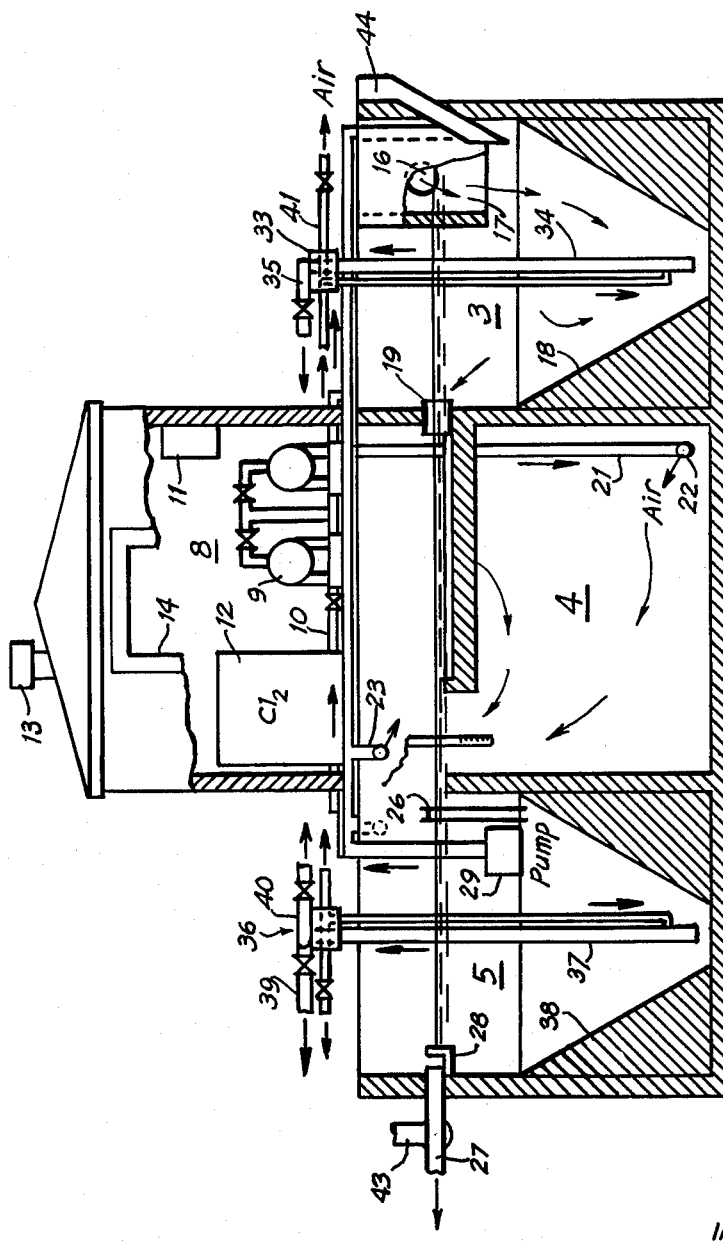
FIGURE 3 is a vertical sectional view taken along the line 3—3 of FIGURE 1, and showing the anaerobic settling tank, the aerobic aeration tank, the aerobic final settling tank and the control house.

A control house 8 is mounted over the central portion of the anaerobic digestion tank 2 and houses auxiliary equipment including blowers 9, which supply heated air through air supply lines 10 positioned in the anaerobic digestion tank 2, as may be seen in FIGURE 2. The air supply line 10 describes a closed circuit with a portion of the pipe being located within the control house 8.

The control house also accommodates an electrical control panel 11, chlorination apparatus 12 for chlorine gas treatment, and also has additional space for laboratory and/or maintenance use. The control house is also provided with an air vent 13, access door 14, and windows plus sufficient interior illumination if desired.

At the bottom of the mixing tank 6 there extends an inclined pipe 15 through which mixed sewage is introduced into the anaerobic treatment tank 2.

The anaerobic settling tank 3 communicates with the other end of the anaerobic digestion tank 2 through a flow pipe 16, one end of which is protected by a curved baffle 17 located in the settling tank 3. During sedimentation in the settling tank 3, the sludge settles in the hopper bottom 18 of this settling tank.

The effluent from the anaerobic settling tank 3 is then flowed into the aerobic aeration tank 4 through a pipe 19 into a distribution channel 20, from which the sewage is then distributed into the aeration tank 4. The channel 20 distributes the sewage from the anaerobic settling tank 3 over about two-thirds of the length of the aeration tank 4 to provide for intimate mixing and a uniform supply of nutrients for the bacteria in the aerobic tank 4.

Air is distributed into the aeration tank 4 by a diffuser assembly 21 having a plurality of diffusers 22. A plurality of spray nozzles 23 are provided at the top of the aerobic aeration tank 4 somewhat above the liquid level therein, to break up foam forming on the top of the contents of the aeration tank 4.

Positioned between the aerobic aeration tank 4 and the aerobic settling tank 5 is a wall 24 which rises to a height just below the liquid level of the contents so that the effluent from the aeration tank 4 can flow over the top of this wall into the aerobic settling tank 5. To regulate the control of the effluent into the settling tank 5, two rows of staggered baffles are provided, as may be seen in FIGURES 4-6. The baffles are adjustably mounted through a slot and fastener arrangement on a beam 25 which is positioned across the settling tank 5 substantially parallel to the overflow wall 24. The baffles 26 are so positioned that the baffles in one row cover the spaces between the baffles of the other row. This adjustment baffling system will insure that the contents overflowing into the settling tank 5 will be uniformly distributed and will flow into the settling tank 5 in a quiet manner with a minimum of turbulence.

An effluent discharge line 27 is provided in the opposite wall of the settling tank 5 and the effluent may move therethrough from the settling tank after passing over a measuring weir 28.

The aerobic settling tank 5 functions as both a settling tank and chlorine contact tank. Suitable means are provided in this tank for chlorinating effluent therein and the longer detention time required for suitable chlorination of the effluent will produce a more satisfactory effluent, both from the biological and bacteriological viewpoints.

In order to accelerate the digestion of accumulated anaerobic sludge in the anaerobic digestion tank 2, air lift pumps 30A and 30B are mounted in opposite ends of the digestion tank 2 and each pump is provided with a recirculation line 31 and draw-off line 32.

In order to break up and dissipate floating material in the various tanks, some chlorinated final effluent is pumped from the aerobic settling tank 5 through a submersible pump 29 to spray headers and to the diffusers 23 which are spaced above the various tanks according to accepted engineering practice. This spray system utilizing chlorinated final tank water will also prevent odors from emanating from the anaerobic digestion tank 2.

An air lift pump 33 is provided above the anaerobic settling tank 3 and has an intake line 34 extending down into the hopper 18, in order to withdraw settled anaerobic sludge from this hopper and recirculate this sludge through pipe 35 into the mixing tank 6 for seeding the raw incoming sewage.

Similarly, an air lift pump 36 is provided above the aerobic settling tank 5 and has an intake line 37 depending into the hopper 38 of this settling tank for recirculating settled sludge to the mixing tank 6 through line 39 and to the aerobic aeration tank through pipe line 40. There is an air pipe 41 extending from lift pump 33 to pump 30A and a similar pipe 42 extending from lift pump 36 to pump 30B.

A by-pass line 43 extends from the anaerobic settling tank 3 to the effluent discharge line 27.

If industrial waste is being treated, neutralization of this waste may be required. Accordingly, a feeding box 44 is provided in the wall of the anaerobic settling tank 3 whereby this settling tank will act as a neutralization tank.

Oxidation reduction potential electrodes 45 are provided in both the anaerobic digestion tank 2 and the aerobic digestion tank 5 and are connected to suitable apparatus in order to maintain the desired ecology in both the anaerobic and aerobic systems.

The above described treatment plant and the process are fully capable of treating any domestic and organic industrial wastes with greatly improved results as obtained by previously known plants and processes.

Thus, it can be seen that the present invention provides both an improved plant and an improved process wherein sewage is subjected to biological treatment through the action of both anaerobic and aerobic systems. The result is an effluent of superior quality with the entire efficiency of the process and apparatus being substantially raised.

It will be understood that this invention is susceptible to modification in order to adapt it to different usages and conditions and, accordingly, it is desired to comprehend such modifications within this invention as may fall within the scope of the appended claims.

What is claimed is:

1. A compact centralized plant for the anaerobic and aerobic treatment of sewage comprising an anaerobic digestion tank having a mixing tank at one end thereof in communication with the digestion tank for receiving raw sewage and the sewage to be recycled, an anaerobic settling tank immediately adjacent and integral with the other end of the anaerobic tank and in communication with the latter, an aerobic digestion tank immediately adjacent and integral with the middle portion of the anaerobic digestion tank and in communication with the anaerobic settling tank, an aerobic settling and chlorination tank immediately adjacent and integral with the first-mentioned end of the anaerobic digestion tank and in communication with the aerobic digestion tank, an overflow weir and a discharge conduit at the remote end of the aerobic settling and chlorination tank, the latter tank being separated from the aerobic digestion tank by an overflow wall, a series of baffles along the latter, a bypass line extending from the anaerobic settling tank to the discharge conduit, an equipment housing mounted over the middle portion of the anaerobic digestion tank, an air conduit extending along the floor of the anaerobic digestion tank, and a blower mounted in said housing and connected to both ends of said air conduit for circulating heated air through the latter.

2. The plant of claim 1 in combination with an air lift pump in the anaerobic settling tank and a conduit connected thereto for returning settled sludge from the anaerobic settling tank to the mixing tank.

3. The plant of claim 1 in combination with an air lift pump in the aerobic settling and chlorination tank for returning settled sludge from the latter tank to the mixing tank.

References Cited by the Examiner
UNITED STATES PATENTS

| | | | |
|---|---|---|---|
| 2,174,873 | 10/39 | Downes et al. | 210—10 |
| 2,777,815 | 1/57 | Forrest | 210—3 |
| 2,875,151 | 2/59 | Davidson | 210—15 X |
| 3,119,770 | 1/64 | Cunetta | 210—15 |

OTHER REFERENCES

Infilco—The Aero-Accelator, a publication of Infilco, Inc., Tucson, Ariz., Bulletin 6510–D, 1957, 15 pp.; pp. 8–15 particularly relied on.

MORRIS O. WOLK, *Primary Examiner.*